3,334,068
EPOXIDE RESIN PROCESS
Wayne F. McWhorter, Harry O. Kirwan, and Dale M. Magre, Louisville, Ky., assignors to Celanese Coatings Company, a corporation of Delaware
No Drawing. Filed Mar. 29, 1965, Ser. No. 443,634
8 Claims. (Cl. 260—47)

This invention relates to a process for preparing epoxide resin compositions. By the process of this invention, lower molecular weight epoxide resins are reacted with dihydric phenols producing higher molecular weight epoxide resins which have excellent color and clarity, good thermal stability and excellent reactivity with curing agents.

In accordance with an embodiment of this invention, heat stable higher molecular weight higher melting polyglycidyl ethers of dihydric phenols are prepared by reacting at a temperature above about 100° C. a first polyglycidyl ether of a dihydric phenol with a dihydric phenol in the ratio of one epoxide equivalent of the first polyglycidyl ether to less than one phenolic hydroxyl equivalent of the dihydric phenol in admixture with a catalyst selected from at least one member of the group consisting of sodium and potassium salts of alkyl acid phosphates to form a second polyglycidyl ether of a dihydric phenol wherein the molecular weight of said second polyglycidyl ether is increased by a factor of about 0.4 to about 15 over the molecular weight of said first polyglycidyl ether.

Polyglycidyl ethers of dihydric phenols having a wide range of molecular weights and melting points can be used in the process of this invention. The molecular weight can be as low as 222 and up to as high as about 2000 with corresponding melting points below room temperature up to about 125° C. However, the preferred polyglycidyl ethers have molecular weights in the range of 340 to about 1500 and melting points from about 0° C. to about 100° C.

The polyglycidyl ethers of dihydric phenols contemplated for use in this invention are the reaction products of an epihalohydrin and a dihydric phenol. The low molecular weight polyglycidyl ethers are prepared by reacting a dihydric phenol in a large amount of epihalohydrin with an alkali, the ratio of reactants being 1 mol of dihydric phenol to from 2 to about 10 mols of epihalohydrin and about 2 equivalents of alkali. The somewhat higher molecular weight polyglycidyl ethers are made using less than 2 mols of epihalohydrin (1.2 to 2 mols) to 1 mol of dihydric phenol with the alkali being approximately equivalent to the epihalohydrin used. These polyglycidyl ethers of dihydric phenols contain more than one up to about two 1,2 epoxide groups per molecule.

The dihydric phenols from which the polyglycidyl ethers are derived are those dihydric phenols which contain 2 phenolic hydroxyl groups and are free from other groups which are normally reactive with epoxide groups. Examples of such reactive groups are amine groups and carboxylic acid groups. Useful dihydric phenols include p,p'-dihydroxydiphenyl propane, commonly known as bisphenol A, resorcinol, 1,4-dihydroxynaphthalene, p,p'-dihydroxydiphenyl methane, dihydroxydiphenyl, dihydroxydiphenyl sulfone, and chlorinated and brominated derivatives such as tetrabromo- and tetrachloro-bisphenol A.

The dihydric phenols that are reacted, by the process of this invention, with lower molecular weight polyglycidyl ethers of dihydric phenols include the dihydric phenols described above. In conducting a specific reaction, the dihydric phenol can be of the same composition as that from which the polyglycidyl ether is derived or it can be different. For instance, the diglycidyl ether of bisphenol A can be reacted with bisphenol A or with resorcinol. By utilizing various combinations of polyglycidyl ethers and dihydric phenols, higher molecular weight polyglycidyl ethers of dihydric phenols having a wide range of physical and chemical properties can be produced. In some instances, a small amount of a monohydric phenol can be incorporated in the reactants to give products having different solubility and reactivity characteristics.

The catalysts employed in the process of this invention are the sodium and potassium salts of alkyl acid phosphates. More particularly, these catalysts are the mono-sodium, mono-potassium, di-sodium and di-potassium salts of monoalkyldiacid phosphates and the mono-sodium and mono-potassium salts of dialkyl mono-acid phosphates. Mixtures of these salts can also be used. The alkyl groups of the alkyl acid phosphate is a hydrocarbon radical containing from one to about eight carbon atoms, and includes the methyl, ethyl, isopropyl, butyl, hexyl and 2-ethylhexyl radicals. These catalysts can be added to the epoxide resin-dihydric phenol components as the solids salts or they can be utilized as aqueous or alcoholic solutions. A particular advantage of these sodium and potassium alkyl phosphates is their solubility in the reactants and in the products, thus giving controllable reactions and clear, homogeneous products.

The molecular weight of the higher molecular weight epoxide resins produced by the process of this invention will depend upon the ratio of dihydric phenol to lower molecular weight epoxide resin employed. For instance, if two mols of a diepoxide resin, having a molecular weight of 380, are reacted with one mol of a dihydric phenol having a molecular weight of 228, the resulting epoxide resin product will have a molecular weight of about 988. The proportions of epoxide resin to dihydric phenol are generally based upon the epoxide equivalent weight and phenolic hydroxyl equivalent of the two components, since the epoxide group and the phenolic hydroxyl are the reactive entities in this process. In order to obtain the higher molecular weight epoxide containing resins of this invention, the epoxide equivalents of the lower molecular weight epoxide resin are used in excess over the phenolic hydroxy equivalents of the dihydric phenol. The ratio of reactants that can be used in this process is 1 epoxide equivalent to about 0.1 to about 0.9 phenolic hydroxyl equivalents, with the preferred range being 1 epoxide equivalent to about 0.2 to about 0.6 phenolic hydroxyl equivalents. Products having molecular weights from about 450 to about 6000 have been readily obtained.

The amount of sodium or potassium salt of the alkyl acid phosphate that is used to catalyze the epoxide-phenol reaction is best defined in terms of the metal ion content of the salt. This amount of catalyst that has been effective in promoting the reaction of the epoxide groups with phenolic hydroxyl groups with substantial exclusion of side reactions is less than about 0.1 percent, expressed as weight percent metal ion in the salt and being based on the combined weight of the epoxide and phenol reactants. The preferred amount of catalyst is about 0.0001 percent up to about 0.006 percent metal ion.

The reaction of epoxide resin and dihydric phenol is carried out at temperatures sufficiently high to keep the reactants and the reaction product fluid. This temperature can be as low as about 100° C. and as high as about 250° C. However, at the lower temperature, the rate of reaction is slow requiring long processing times while at the higher temperature, the reaction is somewhat hard to control and the products are dark in color. The preferred temperature range for this reaction is about 125° C. to about 200° C. The reaction is continued at elevated temperature until substantially all the phenolic hydroxyls have reacted, the time being from about 1 to about 20 hours.

A general procedure for conducting the process of this invention is as follows:

The epoxide resin is weighed into a suitable reactor, and heat is applied. As soon as the resin becomes fluid, stirring is begun and the dihydric phenol is weighed into the reactor. Heating is continued and when the dihydric phenol dissolves in the resin, the catalyst is added. Heating is then continued at the desired temperture until the reaction is complete as evidenced by the disappearance of phenolic hydroxyl groups, which can be determined by infra-red analysis, and by the epoxide equivalent weight of the product. In the actual production of these higher molecular weight resins, the extent of reaction is determined by running viscosity checks on the product, the viscosity of a particular system having been correlated with the phenolic hydroxyl and epoxide content.

The process of this invention can be carried out in the absence of solvents, or various solvents can be used. Suitable solvents are aromatic hydrocarbons, ethers, esters, and ether-esters.

This invention is now further illustrated by reference to the following examples wherein all proportions are expressed in terms of weight. The low molecular weight epoxide resin used in these examples is designated as Epoxide A and is the diglycidyl ether of p,p'-dihydroxydiphenyl propane, having an epoxide equivalent weight of about 190 and a viscosity at 25° C. of 10,000 to 16,000 cps. The catalyst solution used in these examples are of the following compositions:

CATALYST SOLUTION I 68.4 parts of a mixture of dibutyl hydrogen phosphate and monobutyl dihydrogen phosphate in equal molar proportions
31.6 parts of potassium hydroxide
16.1 parts of water

CATALYST SOLUTION II 68.4 parts of a mixture of dibutyl hydrogen phosphate and monobutyl dihydrogen phosphate in equal molar proportions
31.6 parts of potassium hydroxide
50 parts of n-butanol

CATALYST SOLUTION III 37.6 parts of a mixture of dibutyl hydrogen phosphate and monobutyl dihydrogen phosphate in equal molar proportions
12.4 parts of sodium hydroxide
25 parts of water

CATALYST SOLUTION IV 60 parts of a mixture of diethyl hydrogen phosphate and monoethyl dihydrogen phosphate having an acid hydrogen equivalent weight of 85
40 parts of potassium hydroxide
50 parts of ethanol

CATALYST SOLUTION V 34 parts of a mixture of diethyl hydrogen phosphate and monoethyl dihydrogen phosphate having an acid hydrogen equivalent weight of 85
16 parts of sodium hydroxide
25 parts of water

*Example 1*

To a suitable reaction flask equipped with a stirrer, thermometer and condenser were added 2,000 parts of Epoxide A, and 500 parts of p,p'-dihydroxydiphenyl propane. Heat and stirring were applied raising the temperature to 93° C. where 0.25 part of Catalyst Solution I was added. Heating was then continued raising the temperature to 177° C. The temperature was then held at 177° C. to 182° C. for 2 hours and 45 minutes to complete the reaction of the epoxide resin and dihydric phenol. The resulting product had an epoxide equivalent weight of 409 and a melting point of 65° C. The viscosity of the product at 130° C. was 1,000 cps. After heating for 72 hours at 130° C., the viscosity was 1,540 cps., this small increase in viscosity indicating the improved heat stability of this product.

*Example 2*

Using the same procedure as was described in Example 1, 2,000 parts of Epoxide A were reacted with 475 parts of p,p'-dihydroxydiphenyl propane using as catalyst, 0.1598 part of Catalyst Solution II. After heating for 4 hours at 177° C., the resulting product had an epoxide equivalent weight of 413 and a melting point of 64° C. The viscosity at 130° C. was 800 cps. and after 72 hours at 130° C., the viscosity was 1,540 cps.

*Example 3*

To a suitable reaction flask equipped as described in Example 1, were added 1,500 parts of Epoxide A. Heat and stirring were applied raising the temperature to 160° C. where 0.1212 part of Catalyst Solution II was added. While holding the temperature at approximately 166° C., 375.2 parts of p,p'-dihydroxydiphenyl propane were added in four equal increments at one-hour intervals. After all the dihydric phenol had been added, the temperature was held at about 166° C. for three hours and twenty minutes completing the phenol-epoxide reaction. The resulting product had an epoxide equivalent weight of 420 and a melting point of 66° C. The viscosity at 130° C. was 840 cps. and after 72 hours at this temperature, it was 1,680 cps.

*Example 4*

Using the same procedure as was described in Example 3, 2,000 parts of Epoxide A were reacted with 474 parts of p,p'-dihydroxydiphenyl propane using 0.1451 part of Catalyst Solution III. The resulting product had an epoxide equivalent weight of 412 and a melting point of 66° C. The viscosity at 130° C. was 840 cps. and after 72 hours at 130° C., the viscosity was 1,092 cps.

*Example 5*

Using the same procedure as was described in Example 3, 2,000 parts of Epoxide A were reacted with 474 parts of p,p'-dihydroxydiphenyl propane using 0.1262 part of Catalyst Solution IV. The resulting product had an epoxide equivalent weight of 421 and a melting point of 66° C. The viscosity at 130° C. was 949 cps., and after 72 hours at 130° C., the viscosity was 1,480 cps.

*Example 6*

Using the same procedure as was described in Example 3, 2,000 parts of Epoxide A were reacted with 474 parts of p,p'-dihydroxydiphenyl propane using 0.112 part of Catalyst Solution V. The resulting product had an epoxide equivalent weight of 417 and a melting point of 65° C. The viscosity at 130° C. was 920 cps. and after 72 hours at this temperature, the viscosity was 1,588 cps.

*Example 7*

To a suitable reaction flask equipped as described in Example 1, were added 780 parts of Epoxide A and 198 parts of p,p'-dihydroxydiphenyl propane. Heating and stirring were applied raising the temperature to 71° C. where 0.257 part of Catalyst Solution II was added. The temperature was then raised to 132° C. and was held at 132° C.–138° C. for 9 hours and 30 minutes. 15.1 parts of p,p'-dihydroxydiphenyl propane were added and heating at 138° C. was continued for 1 hour and 40 minutes. The resulting product had an epoxide equivalent weight of 462 and a melting point of 66.7° C.

The reactivity of the epoxide resins produced by the process of this invention was determined by the following test:

50 grams of the epoxide resin were weighed into a 125 ml. beaker and were heated to 130° C. 15 grams of phthalic anhydride were weighed into the beaker, and the mixture was stirred with heating to bring the temperature back to 130° C. When a clear solution was obtained, the entire mixture was added to a test tube (38×135 mm.) which was immersed in a 130° C. oil bath. The test tube depth in the oil bath was adjusted so that the surface of the resin/anhydride solution was approximately ½ inch below the surface of the oil. The viscosity of the resin-hardener solution was followed with a Brookfield Viscosimeter, using a No. 2 spindle immersed in the resin and rotating at 12 r.p.m. The time, in minutes, for the viscosity to reach 1,500 cps. was taken as the reactivity of the resin.

The reactivity of the resins described in the preceding examples was as follows.

| Example: | Reactivity, min. |
|---|---|
| 1 | 40 |
| 2 | 101 |
| 3 | 101 |
| 4 | 108 |
| 5 | 100 |
| 6 | 102 |

*Example 8*

To 100 parts of the epoxide resin product of Example 2 were added 30 parts of phthalic anhydride. The reactants were heated to 90° C.–110° C. with stirring to dissolve the anhydride in the resin. When a clear solution was obtained, the solution was poured into a mold and was cured by heating at 150° C. for 4 hours. The resulting well-cured product had the following physical properties:

| | |
|---|---|
| Ultimate tensile strength _____p.s.i__ | 11,100 |
| Percent tensile elongation _____percent__ | 2.7 |
| Ultimate flexural strength _____p.s.i__ | 21,650 |
| Izod Impact (ft./lbs./in. notch) _____ | 0.42 |
| Rockwell M Hardness _____ | 99 |
| Water absorption (24 hours at 25° C.)__percent__ | 0.13 |
| Heat distortion temperature _____° C__ | 90 |

Well cured resins with similar properties were obtained when the resins produced by the other examples were cured in a similar manner.

The higher molecular weight epoxide resins produced by this invention are useful in the production of varnishes, molding resins, adhesives and the like. They can be cured with any of the well-known conventional epoxy resin curing agents to produce insoluble and infusible products. Epoxy resins which contain minor amounts of the sodium and potassium salts of alkyl acid phosphates have excellent reactivity toward curing agents, thus producing cured resins having excellent tensile and flexural strength properties, and excellent adhesion to metals, plastics, wood and the like.

It is to be understood that the foregoing detailed description is given merely by way of illustration and that many variations may be made therein without departing from the spirit of the invention.

The embodiments of the invention in which an exclusive property or privilege is claimed are defined as follows:

1. A process for preparing heat stable polyglycidyl ethers of dihydric phenols which comprises reacting at a temperature above 100° C. a first polyglycidyl ether of a dihydric phenol with a dihydric phenol in the ratio of one epoxide equivalent of the first polyglycidyl ether to less than one phenolic hydroxyl equivalent of the dihydric phenol in admixture with a catalyst selected from at least one member of the group consisting of sodium and potassium salts of alkyl acid phosphates to form a second polyglycidyl ether of a dihydric phenol wherein the molecular weight of said second polyglycidyl ether is increased by a factor of about 0.4 to about 15 over the molecular weight of said first polyglycidyl ether.

2. The process of claim 1, wherein the first polyglycidyl ether of a dihydric phenol has a molecular weight of about 222 to about 2000.

3. The process of claim 1 wherein the first polyglycidyl ether is a polyglycidyl ether of p,p'-dihydroxyphenyl propane and the dihydric phenol is p,p'-dihydroxydiphenyl propane.

4. The process of claim 1 wherein the catalyst is the sodium salt of diethyl hydrogen phosphate.

5. The process of claim 1 wherein the catalyst is the potassium salt of an equimolar mixture of dibutyl hydrogen phosphate and monobutyl dihydrogen phosphate.

6. The process of claim 1 wherein the first polyglycidyl ether of the dihydric phenol is reacted with the dihydric phenol in the ratio of 1 epoxide equivalent of the polyglycidyl ether to about 0.1 to about 0.9 phenolic hydroxyl equivalents of the dihydric phenol.

7. The process of claim 1 wherein the catalyst is used in the amounts of less than 0.01 weight percent metal ion in the salt based on the combined weight of the first polyglycidyl ether of the dihydric phenol and the dihydric phenol.

8. The process of claim 1 wherein the reactants are heated to a temperature of about 100° C. to about 250° C. until the hydroxyl groups of the dihydric phenol are substantially reacted.

No references cited.

WILLIAM H. SHORT, *Primary Examiner.*

T. D. KERWIN, *Assistant Examiner.*